(12) United States Patent  
Dejaune et al.

(10) Patent No.: US 7,963,034 B2
(45) Date of Patent: Jun. 21, 2011

(54) ASSEMBLY OF A LABYRINTHE SEAL SUPPORT ON A TURBINE MACHINE ROTOR

(75) Inventors: Claude Gerard Rene Dejaune, Boissise la Bertrandt (FR); Valerie Gros, Grisy Suisnes (FR)

(73) Assignee: SNECMA, Paris (FR)

( * ) Notice: Subject to any disclaimer, the term of this patent is extended or adjusted under 35 U.S.C. 154(b) by 1209 days.

(21) Appl. No.: 11/494,586

(22) Filed: Jul. 28, 2006

(65) Prior Publication Data

US 2007/0025843 A1 Feb. 1, 2007

(30) Foreign Application Priority Data

Jul. 29, 2005 (FR) ...................................... 05 08152

(51) Int. Cl.
*B21K 25/00* (2006.01)
*B23P 15/04* (2006.01)

(52) U.S. Cl. ........ 29/889.3; 29/889; 29/889.1; 29/889.4; 411/338; 411/383; 411/395; 415/115; 415/173.4; 415/173.7; 415/174.4

(58) Field of Classification Search .................. 29/889, 29/889.1, 889.2, 889.3, 889.4; 415/115, 415/173.4, 173.7, 174.4; 411/383, 338, 395
See application file for complete search history.

(56) References Cited

U.S. PATENT DOCUMENTS 2,764,266 A 9/1956 Haworth
5,226,788 A 7/1993 Fledderjohn

*Primary Examiner* — Rick K Chang
(74) *Attorney, Agent, or Firm* — Oblon, Spivak, McClelland, Maier & Neustadt, L.L.P.

(57) ABSTRACT

A method of attaching a labyrinth seal support to a turbine engine shaft is disclosed. The method includes inserting axial bolts to secure the labyrinth seal support, the shaft and a device for driving the turbine module with the shaft, and screwing tightening screws in extracting holes, for extracting the drive device with respect to the shaft, provided on the shaft to tighten the labyrinth seal support onto the shaft.

12 Claims, 3 Drawing Sheets

ASSEMBLY OF A LABYRINTHE SEAL SUPPORT ON A TURBINE MACHINE ROTOR

BACKGROUND OF THE INVENTION

1. Field on the Invention

The invention relates to the field of turbine engines and gas turbine engines in particular and concerns the assembly of an element forming a support for a labyrinth seal on a rotor of the engine.

2. Description of Related Art P A gas turbine engine comprises at least one rotating shaft mounted inside a fixed structure forming the stator, and in which it is supported by bearings. The bearings are enclosed in housings receiving, in particular, lubricating oil. Seals, generally labyrinth seals, are positioned between the support for a bearing and the rotor, so as to prevent oil which serves to lubricate the bearing from escaping out of the bearing zone and contaminating the engine.

A labyrinth seal comprises a moveable part integral with the rotor and a fixed part integral with the stator. The moveable part consists of a revolving part at the surface of which a plurality of radial blades or seal teeth are provided perpendicular to the axis of rotation. The part is bolted onto the rotor close to the bearing of which it must now provide a seal. The blades of this part are held at a small radial distance from a ring integral with the fixed part, so that any flow of fluid from the zone under excess pressure on one side of the blades to the lower pressure zone on the other side of the blades is reduced as much as possible. The ring is made of a material that wears or deforms preferentially compared with the blades so that the seal can absorb radial expansions during the different operating phases of the engine. It consists of a honeycomb or of an abradable type of material.

The arrangement and assembly of such a seal has been shown in FIGS. 1, 2 and 3, in the region of the turbine bearing of an aeronautical gas turbine engine. FIG. 1 shows the part of the engine having the bearing 1 of the low pressure rotor. The bearing support 3 is located in the oil recovery housing 5 on the stator side. The rotating part 7 supporting the labyrinth seals and partly delimiting the bearing chamber here has a U-shaped section with a central radial part. It is mounted on a radial flange 91 of the shaft 9 of the motor on which the drive component or cone 93 is fixed connecting the turbine module 10, here the low pressure turbine, to the shaft 9. The moveable seal support is provided with several groups of radial blades 71, each cooperating with a ring 31 and 51, integral with the bearing support 3 and the oil recovery housing 5 respectively.

FIGS. 2 and 3 show in greater detail the assembly of the seal support 7 on the turbine rotor. The seal support is fixed to the shaft by axial bolts 95 passing through the wall of the drive cone 93 and the flange 91 of the shaft, while holding them assembled. These bolts are distributed, by reason of the load transmitted by the turbine to the shaft, on the periphery of the flange 91. Extraction holes 91A are also provided. There are four of these that are positioned along two diameters at a right angle. The extraction holes machined in the flange 91 are axial, and flared out on the side of the drive cone 93. The extraction holes 91A communicate with the holes 75 machined in the radial portion 73 of the seal support 7. It will be noted that, contrary to the housings for the bolts 95, they do not extend into the wall of the cone 93. A cylindrical insert 91B is housed in each of the four holes 91A. The inserts comprise a collar 91B1 extending into the flared-out part of the holes 91A and ensure that they are axially immobilized. These holes, which remain free from a bolt during the time when the motor is operational, have the function of making it easier to dismantle the drive cone. With this aim in mind, screws are introduced into each of the holes 91A at the time that the engine is dismantled. By screwing the extraction screws into the inserts 91B housed in the holes 91A, their stems are applied against the wall of the cone which is blind at this point and in this way an axial force is created tending to separate the cone 93 from the rotor 9.

Cracks are liable to form in the revolving part 7. Indeed, tightening conditions induce a risk of starting a crack by fretting, at the edges of a free extraction hole.

BRIEF SUMMARY OF THE INVENTION

The object of the invention is therefore to overcome this problem.

Another object is to find a solution which does not involve the modification of parts that are present so that it can be adapted to engines currently in service.

Another object is also to develop a solution which is less onerous both as regards operating costs as well as excess engine weight.

These objectives are achieved by a method for attaching a labyrinth seal support to a turbine engine shaft by means of axial bolts, said axial bolts also securing a device for driving the turbine module with said shaft, holes for extracting the drive device with respect to the shaft being provided on the shaft, characterized in that the labyrinth seal support is tightened onto the shaft into the zone of the extraction holes by means of tightening screws introduced into the extraction holes.

In particular, since the extraction holes are provided with a screwing insert, the screws are screwed into the insert. Preferably, a bush is provided for guiding the tightening screws into said extraction holes.

The invention also relates to a turbine engine comprising a labyrinth seal support attached to the shaft thereof according to the above method.

BRIEF DESCRIPTION OF THE DRAWINGS

A non-limiting embodiment of the invention will now be described with reference to the appended drawings in which.

DETAILED DESCRIPTION OF THE INVENTION

Figure 3:
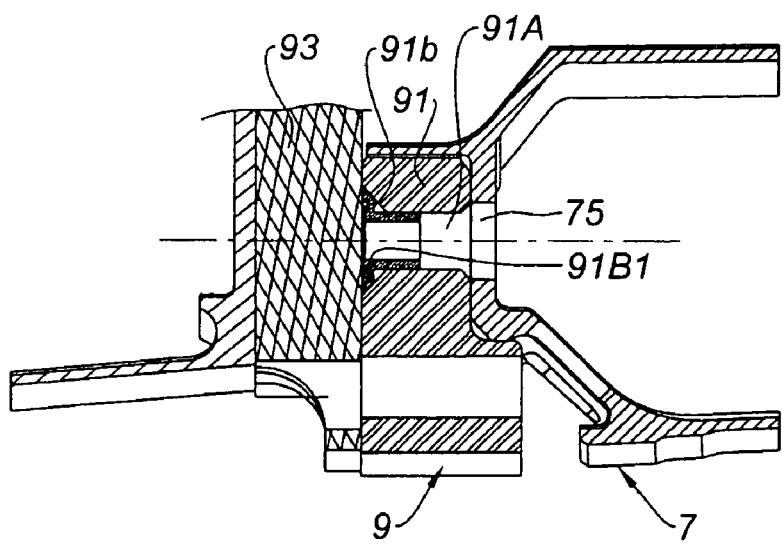
FIG. 3 is a view in axial section along 3-3 of FIG. 2, along an extraction hole.
Figure 4:
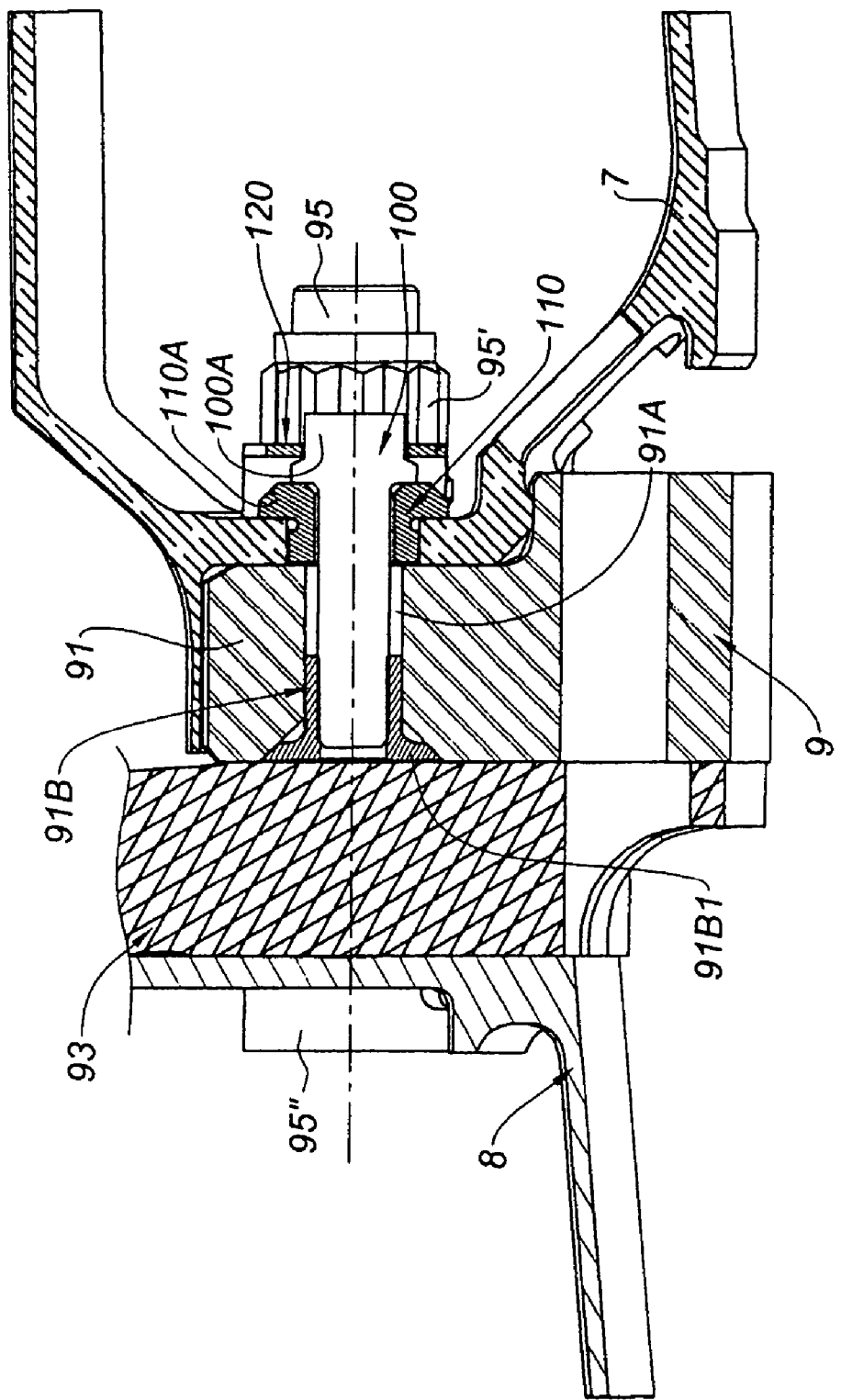
FIG. 4 is a view corresponding to FIG. 3 with the tightening screw in the extraction hole according to the invention.

Compared with FIG. 3, FIG. 4 shows the solution of the invention with the incorporation a tightening screw 100. The upstream portion will be seen of the annular support for the rear labyrinth seal 7 with the radial part 73 resting against the flange 91 of the engine shaft 9. The support 7 is held by bolts of which, on the one hand the nut 95' can be seen of the bolt 95 in the immediate vicinity of the extraction hole 91A and, on the other hand the head 95". The nuts also ensure that the front labyrinth seal carrier is held in place. The radial blades of the labyrinth seal 71 are also not visible in this figure.

In order to ensure, according to the invention, that this part of the ring is tightened against the flange 91, tightening screws 100 are incorporated in the extraction holes 91A.

These tightening screws, that are four in number, one per extraction hole, are screwed into the inserts 91B. A bush 110 takes up the play between the screw 100 and the edge of the corresponding hole 75 in the wall 73. The bush has a collar 110A sandwiched between the wall 73 and the head 100A of the screw. By screwing the screw 100 into the insert 91B with a suitable tightening torque, this portion of the annular support 7 is applied against the flange 91 with a force that enables in particular stresses of vibrational origin to be reduced.

An anti-rotation plate 120 is mounted on the head 100A of the screw so as to prevent any premature unscrewing when the engine is operating. This plate is itself held by the nut of the bolt 95 close to the screw 100.

Figure 1:
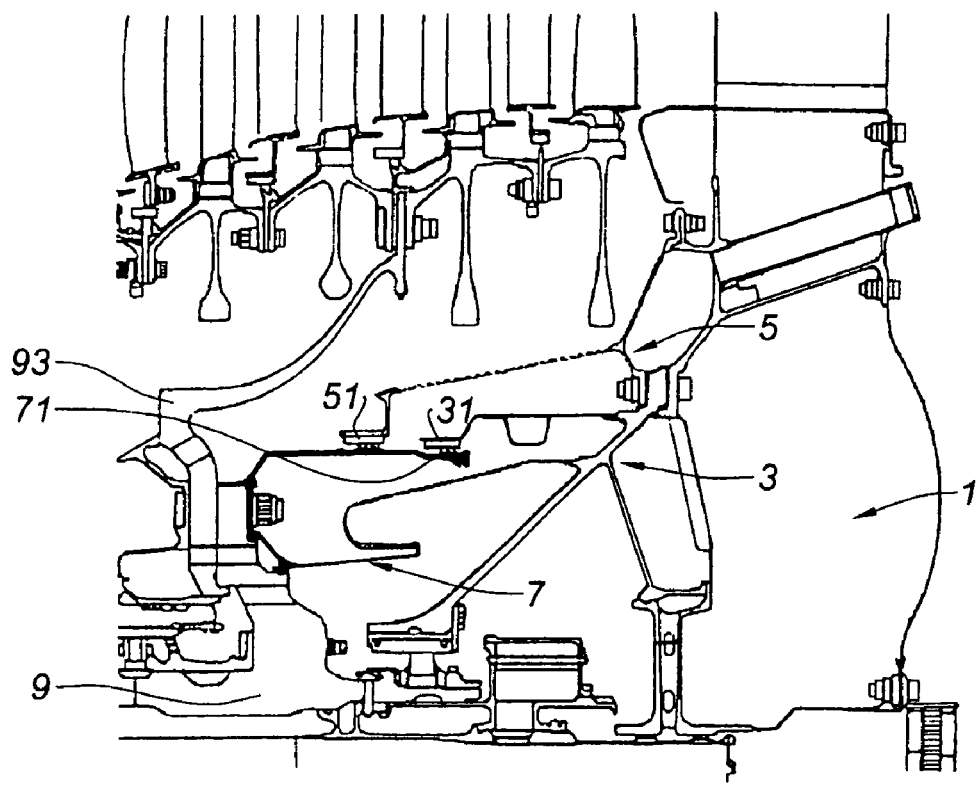
FIG. 1 is a partial longitudinal view of the bearing zone of the low pressure turbine of a known gas turbine engine with a double body.
Figure 5:
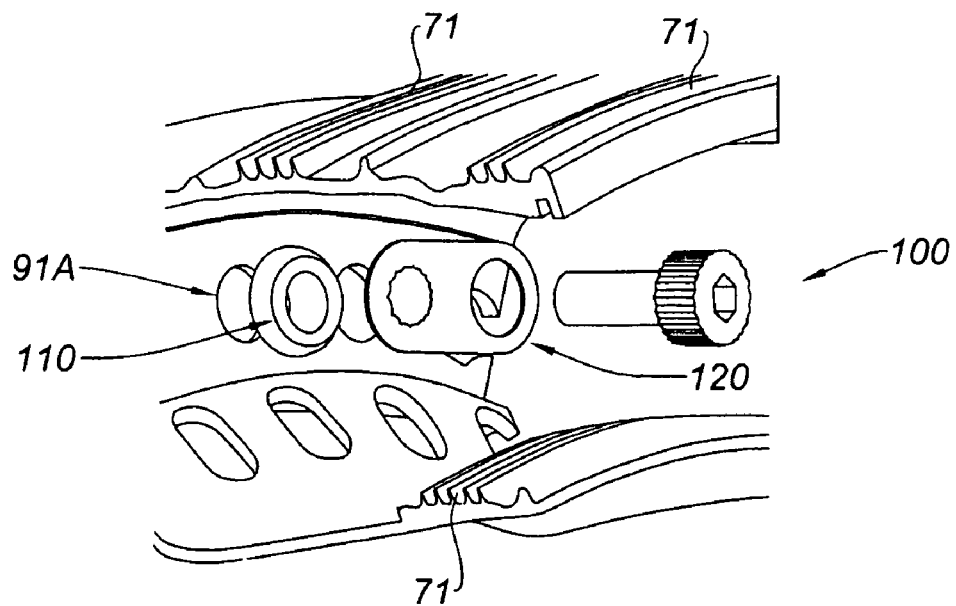
FIG. 5 is an exploded perspective view of the zone of the extraction holes with a presentation of the corresponding tightening screw.
Figure 2:
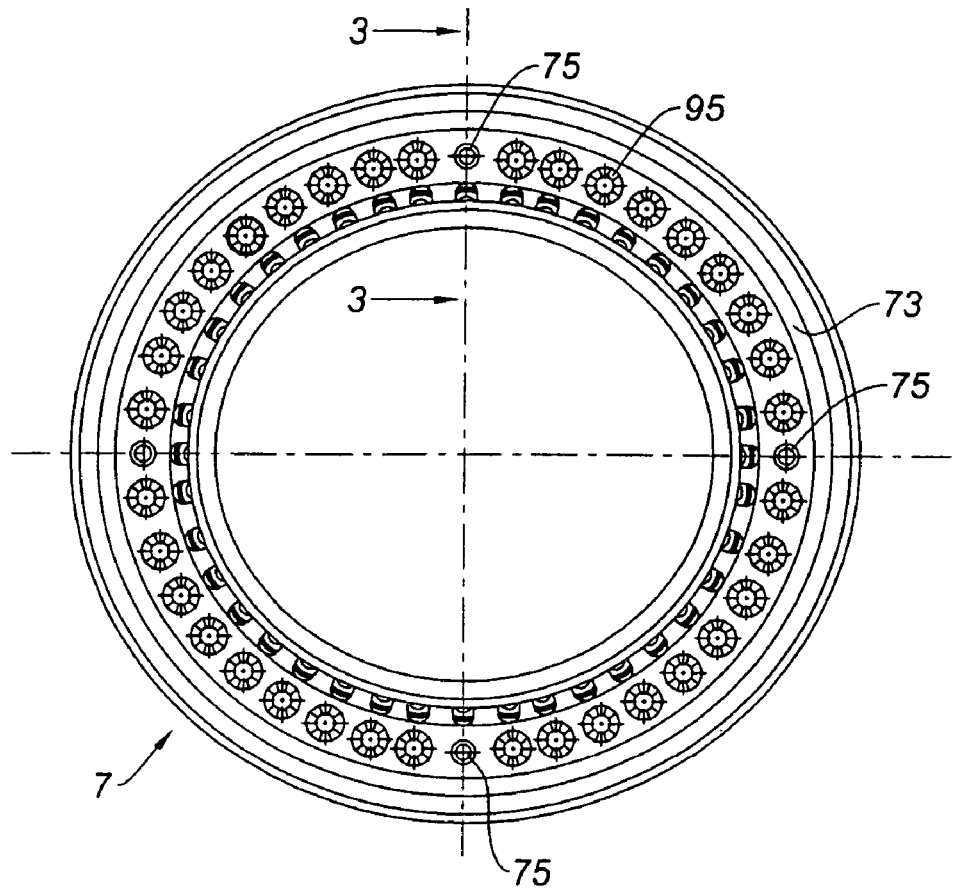
FIG. 2 is a view along the axial direction upstream of the single annular support for the labyrinth seal of FIG. 1.

The screws, bush and plate will be seen in FIG. 5 in position so that they can be put in place in the extraction hole.

The solution of the invention has the advantage that it can be applied simply with a very small increase in the mass of the engine.

The invention claimed is:

1. A method for attaching a labyrinth seal support to a turbine engine shaft, comprising:
    inserting an axial bolt into a first hole provided in the labyrinth seal support, a first hole provided in the shaft and a hole provided in a device which drives a turbine module with the shaft, the first hole provided in the labyrinth seal support, the first hole provided in the shaft and the hole provided in the drive device being coaxial, the shaft being sandwiched between the labyrinth seal support and the drive device in an axial direction; and
    screwing a tightening screw into a second hole provided in the shaft and a second hole provided in the labyrinth seal support such that the labyrinth seal support is tightened onto the shaft, the second hole provided in the shaft and the second hole provided in the labyrinth seal support being coaxial, the second hole provided in the shaft being an extraction hole for extracting the drive device with respect to the shaft,
    wherein the first hole provided in the shaft is adjacent to the second hole provided in the shaft and the first hole provided in the labyrinth seal support is adjacent to the second hole provided in the labyrinth seal support.

2. The method of attachment according to claim 1, wherein the second hole is provided with a screwing insert, and the tightening screw is screwed into the insert.

3. The method of attachment according to claim 2, wherein a bush is introduced into the second hole of the labyrinth seal support for guiding the tightening screw.

4. The method of attachment according to claim 1, wherein the tightening screw is locked by an anti-rotation plate.

5. The method of attachment according to claim 1, wherein the turbine module is the low pressure module of the engine.

6. The method of attachment according to claim 1, wherein the first hole provided in the shaft is circumferentially adjacent to the second hole provided in the shaft and the first hole provided in the labyrinth seal support is circumferentially adjacent to the second hole provided in the labyrinth seal support.

7. The method of attachment according to claim 1, wherein a radial distance between the first hole provided in the shaft and an axis of the turbine engine is the same as a radial distance between the second hole provided in the shaft and the axis of the turbine engine.

8. The method of attachment according to claim 1, wherein the labyrinth seal support abuts the shaft at a first radial face and a second radial face, and the first radial face is radially outward of the second radial face.

9. The method of attachment according to claim 1, further comprising attaching a nut to the axial bolt, the nut being closer to a head of the tightening screw than a head of the axial bolt.

10. The method of attachment according to claim 2, wherein a portion of the second hole provided in the shaft is flared out toward the drive device, and the insert includes a collar which extends into the flared-out portion of the second hole provided in the shaft.

11. The method of attachment according to claim 3, wherein the bush includes a collar which is sandwiched between a head of the tightening screw and the labyrinth seal support.

12. The method of attachment according to claim 4, wherein the axial bolt passes through a first hole provided in the anti-rotation plate and the tightening screw passes through a second hole provided in the anti-rotation plate.

* * * * *

UNITED STATES PATENT AND TRADEMARK OFFICE
CERTIFICATE OF CORRECTION

| | | |
|---|---|---|
| PATENT NO. | : 7,963,034 B2 | |
| APPLICATION NO. | : 11/494586 | |
| DATED | : June 21, 2011 | |
| INVENTOR(S) | : Dejaune et al. | |

It is certified that error appears in the above-identified patent and that said Letters Patent is hereby corrected as shown below:

Column 1, line 6, "2. Description of Related Art" should be a heading;

Column 1, line 6, delete "P" before "A gas turbine."

Signed and Sealed this
Thirteenth Day of September, 2011

David J. Kappos
*Director of the United States Patent and Trademark Office*